(12) United States Patent
Oba

(10) Patent No.: US 10,817,394 B2
(45) Date of Patent: Oct. 27, 2020

(54) ANOMALY DIAGNOSIS METHOD AND ANOMALY DIAGNOSIS APPARATUS

(71) Applicant: Panasonic Intellectual Property Corporation of America, Torrance, CA (US)

(72) Inventor: Tatsumi Oba, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 107 days.

(21) Appl. No.: 16/136,408

(22) Filed: Sep. 20, 2018

(65) Prior Publication Data
US 2019/0095300 A1      Mar. 28, 2019

(30) Foreign Application Priority Data

Sep. 27, 2017   (JP) .................................. 2017-186889

(51) Int. Cl.
*G06F 11/00*      (2006.01)
*G06F 11/22*      (2006.01)
(Continued)

(52) U.S. Cl.
CPC ...... *G06F 11/2257* (2013.01); *G05B 23/0281* (2013.01); *G06N 20/00* (2019.01)

(58) Field of Classification Search
CPC .............. G06F 11/0754; G06F 11/079; G06F 11/2257; G06F 11/3409; G06F 11/3447
See application file for complete search history.

(56) References Cited

U.S. PATENT DOCUMENTS 7,565,340 B2 *   7/2009   Herlocker .............. G06Q 10/10
                                                                  706/52
8,831,911 B2     9/2014   Lipowsky et al.
(Continued)

FOREIGN PATENT DOCUMENTS

JP   2013-041492       2/2013
JP   2013-199804      10/2013
(Continued)

OTHER PUBLICATIONS

The Extended European Search Report dated Feb. 15, 2019 for European Patent Application No. 18195899.2.
(Continued)

*Primary Examiner* — Elmira Mehrmanesh
(74) *Attorney, Agent, or Firm* — Greenblum & Bernstein, P.L.C.

(57) ABSTRACT

There is provided an anomaly diagnosis method performed by an anomaly diagnosis apparatus that diagnosis to determine whether an observed value composed of values of variables representing a state of a monitoring target obtained by observing the monitoring target is anomalous. The anomaly diagnosis apparatus includes a processor and a memory. The memory stores an anomaly detection model generated by learning using observed values. The processor acquires group information indicating one or more groups each constituted by a combination of at least two mutually-related variables, acquires the observed value, determines whether the observed value is anomalous by employing the anomaly detection model read from the memory, and in a case where the observed value is determined to be anomalous, identifies a group causing an anomaly among the one or more groups in the observed value.

9 Claims, 9 Drawing Sheets

(51) Int. Cl.
*G06N 20/00* (2019.01)
*G05B 23/02* (2006.01)

(56) References Cited

U.S. PATENT DOCUMENTS

| | | | | |
|---|---|---|---|---|
| 8,832,497 | B2* | 9/2014 | Bluvband | G06F 11/008 714/26 |
| 9,714,885 | B2* | 7/2017 | Qin | G01M 17/08 |
| 10,187,326 | B1* | 1/2019 | Anand | H04L 47/822 |
| 10,216,558 | B1* | 2/2019 | Gaber | G06F 11/0727 |
| 10,310,929 | B2* | 6/2019 | Bovey | G05B 23/0278 |
| 2007/0028219 | A1* | 2/2007 | Miller | G05B 23/021 717/124 |
| 2008/0276136 | A1 | 11/2008 | Lin et al. | |
| 2011/0276828 | A1 | 11/2011 | Tamaki et al. | |
| 2015/0220847 | A1* | 8/2015 | Shibuya | G06N 5/047 706/12 |
| 2015/0363925 | A1 | 12/2015 | Shibuya et al. | |
| 2016/0088006 | A1* | 3/2016 | Gupta | H04L 43/08 726/23 |
| 2016/0239755 | A1* | 8/2016 | Aggour | G05B 23/0229 |
| 2017/0102984 | A1 | 4/2017 | Jiang et al. | |
| 2018/0095004 | A1* | 4/2018 | Ide | G01M 13/00 |
| 2019/0163594 | A1* | 5/2019 | Hayden | G06F 11/3495 |
| 2019/0213446 | A1* | 7/2019 | Tsou | H04W 4/38 |

FOREIGN PATENT DOCUMENTS

| | | |
|---|---|---|
| JP | 2014-142697 | 8/2014 |
| WO | 2010/082322 | 7/2010 |

OTHER PUBLICATIONS

Shah Reehan Ali et al: "Group Feature Selection Via Structural Sparse Logistic Regression for IDS", 2016 IEEE 18th International Conference on High Performance Computing and Communications; IEEE 14th International Conference on Smart City; IEEE 2nd International Conference on Data Science and Systems (HPCC/SMARTCITY/DSS), IEEE, Dec. 12, 2016 (Dec. 12, 2016), pp. 594-600, XP033052449.

Robin Sommer et al., "Outside the Closed World: On Using Machine Learning for Network Intrusion Detection", Security and Privacy, IEEE Symposium on. IEEE, 2010.

Mahbod Tavallaee et al., "A Detailed Analysis of the KDD CUP 99 Data Set", Submitted to Second IEEE Symposium on Computational Intelligence for Security and Defense Applications (CISDA), 2009.

Tomas Mikolov et al., "Distributed Representations of Words and Phrases and their Compositionality", Advances in neural information processing systems, 2013.

Sen Yang et al., "Feature Grouping and Selection Over an Undirected Graph", Graph Embedding for Pattern Analysis, Springer New York, 2013, pp. 27-43.

Jingping Song et al., "Feature Grouping for Intrusion Detection System Based on Hierarchical Clustering", International Conference on Availability, Reliability, and Security springer International Publishing, 2014.

* cited by examiner

FIG. 5

| ITEM | OBSERVED VALUE 1 | OBSERVED VALUE 2 | OBSERVED VALUE 3 | OBSERVED VALUE 4 | OBSERVED VALUE 5 | OBSERVED VALUE 6 | OBSERVED VALUE 7 |
|---|---|---|---|---|---|---|---|
| SESSION DURATION (sec) | 1 | 0 | 1419 | 0 | 0 | 5291 | 5166 |
| PROTOCOL TYPE | tcp | tcp | tcp | tcp | udp | tcp | tcp |
| SERVICE NAME | ftp | http | telnet | http | other | http | http |
| FLAG | SF | SF | RST | S0 | SF | SF | SF |
| AMOUNT OF DATA TRANSMITTED FROM SERVER | 415 | 373 | 150 | 0 | 0 | 54510 | 41059 |
| AMOUNT OF DATA RECEIVED BY SERVER | 129 | 431 | 450 | 0 | 0 | 7921 | 1951 |
| NUMBER OF RECENT COMMUNICATION ACTIVITIES OF SERVER | 195 | 3 | 1 | 33 | 3 | 5 | 6 |
| RECENT SERVER-ERROR RATE | 0 | 0.01 | 0 | 1 | 0 | 0 | 0 |
| LOGIN STATUS | 1 | 0 | 1 | 1 | 0 | 0 | 1 |
| ROOT SHELL FLAG | 0 | 0 | 1 | 0 | 0 | 0 | 0 |
| NUMBER OF INSTRUCTIONS EXECUTED AT ROOT | 0 | 0 | 53 | 0 | 0 | 0 | 0 |

FIG. 6B

| Item | Group 1a | Group 2a | No group |
|---|---|---|---|
| Session duration (sec) | ● | ○ | ○ |
| Protocol type | ○ | ○ | ● |
| Service name | ○ | ○ | ● |
| Flag | ○ | ○ | ● |
| Amount of data transmitted from server | ● | ○ | ○ |
| Amount of data received by server | ● | ○ | ○ |
| Number of recent communication activities of server | ○ | ○ | ● |
| Recent server-error rate | ○ | ○ | ● |
| Login status | ○ | ○ | ● |
| Root shell flag | ○ | ● | ○ |
| Number of instructions executed at root | ○ | ● | ○ |

Group setting

Add group    Delete group

ANOMALY DIAGNOSIS METHOD AND ANOMALY DIAGNOSIS APPARATUS

BACKGROUND

1. Technical Field

The present disclosure relates to an anomaly diagnosis method and an anomaly diagnosis apparatus for identifying a variable contributing to an anomaly in multidimensional information.

2. Description of the Related Art

Anomaly detection performed by diagnosing whether observed values of multiple variables include an anomaly is known as disclosed in Japanese Patent Nos. 6076751 (Patent literature 1), 5858839 (Patent literature 2), 5811683 (Patent literature 3), and 5108116 (Patent literature 4), and Sommer, Robin, and Vern Paxson. "Outside the closed world: On using machine learning for network intrusion detection." Security and Privacy (SP), 2010; IEEE Symposium on. IEEE, 2010 (Non patent literature 1).

SUMMARY

In one general aspect, the techniques disclosed here feature an anomaly diagnosis method performed by an anomaly diagnosis apparatus that performs a diagnosis to determine whether an observed value composed of values of multiple variables representing a state of a monitoring target obtained by observing the state of the monitoring target is anomalous. The anomaly diagnosis apparatus includes a processor and a memory. The memory stores an anomaly detection model generated by learning by using multiple observed values. The processor acquires group information indicating one or more groups each constituted by a combination of at least two variables that are related to each other among the multiple variables, acquires the observed value, determines whether the observed value is anomalous by employing the anomaly detection model that is read from the memory, and in a case where the observed value is determined to be anomalous, identifies a group causing an anomaly among the one or more groups in the observed value in accordance with the observed value and the one or more groups indicated by the group information.

The anomaly diagnosis method and the anomaly diagnosis apparatus of the present disclosure can effectively identify the cause of an anomaly.

It should be noted that general or specific embodiments may be implemented as a system, an apparatus, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a table illustrating an example of observation data obtained from a monitoring target;

FIG. 6B illustrates another example of a UI displayed on a display to configure group settings for the anomaly diagnosis apparatus according to the embodiment;

Figure 1:
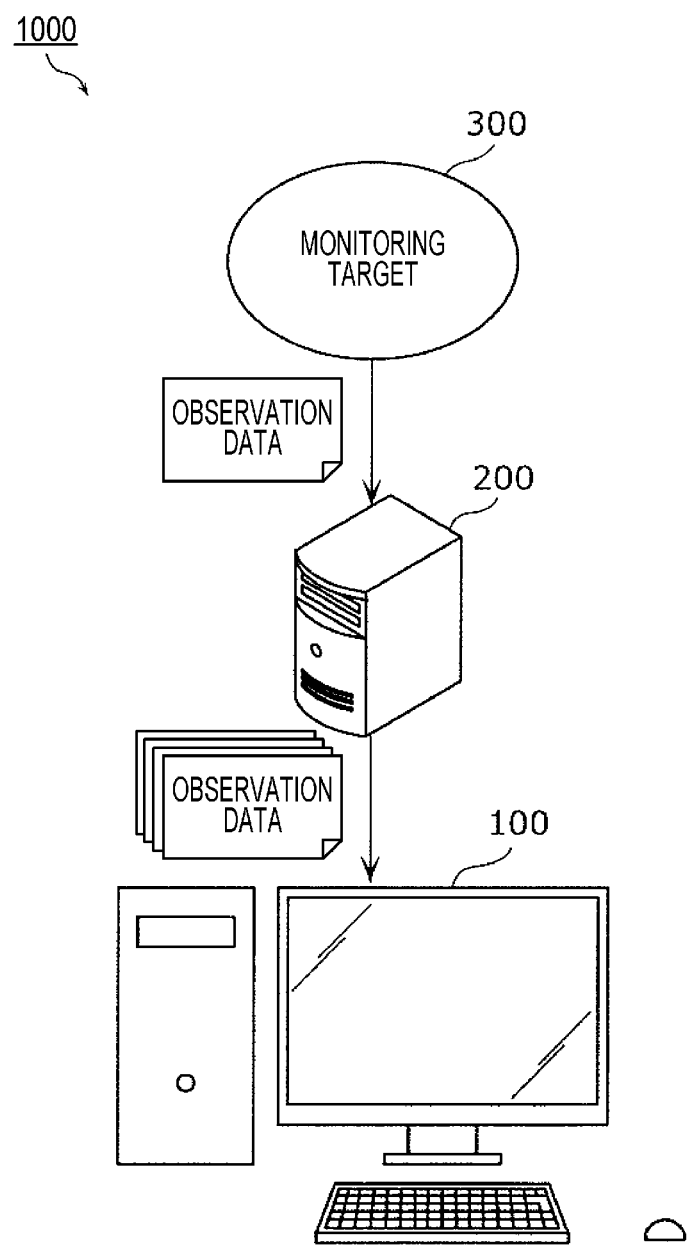
FIG. 1 is a schematic diagram illustrating an anomaly diagnosis system according to an embodiment.

DETAILED DESCRIPTION (Underlying Knowledge Forming Basis of the Present Disclosure)

In recent years, adoption of information technology (IT) and automation have advanced greatly in facilities such as factories. To automate such facilities efficiently and safely, precise sensing and appropriate feedback are essential. Hence, anomaly detection, in which anomalies due to a failure, a cyberattack, or the like are detected, is a crucial technique for avoiding in advance heavy losses that may be caused by a fault in the facility.

Meanwhile, even if an anomaly can be appropriately detected, determining the cause of the anomaly involves a different kind of difficulty. The typical method of anomaly detection using machine learning merely detects an event that is unlikely to occur under a normal condition, and any information on the cause of the anomaly cannot be acquired. As a result, anomaly detection is not effectively employed especially in fields such as networking where various possibilities may lead to abnormal conditions (see Non patent literature 1).

To identify the cause of an anomaly, identifying, among the observed values, a variable that significantly contributes to the anomaly is effective. For example, when a sensor does not work well, only the observed value for the faulty sensor is expected to be an outlier. Accordingly, when it is detected that a specific observed value is anomalous, the fact that the failure of the sensor, from which the observed value is obtained, causes the anomaly can be determined immediately (see Patent literature 1 and 2).

However, the anomaly diagnosis performed in reality is not aimed at finding only a faulty sensor. In many cases, a single fundamental phenomenon or a single cause in fact affects observed values for, for example, multiple sensors. For example, both the mathematics test score and the physics test score are affected by mathematical thinking as a fundamental factor. It can thus be said that both scores strongly correlate with each other. As described, an anomalous phenomenon that impacts a fundamental factor simultaneously affects multiple variables.

In the method of Patent literature 3, when it is determined that a variable may be anomalous, multiple variables strongly correlating with the variable are extracted. It is highly expected that variables strongly correlating with each other are affected by a common factor. Hence, this method is useful for anomaly diagnosis. Similarly, in the method of Patent literature 4, variables strongly correlating with each other are grouped as collinearity data items.

However, the above-described method is intended for the failure diagnosis for physical systems such as facilities or sensors in a chemical plant or the like. Hence, when the anomaly diagnosis model is relatively complex, for example, such that the model is intended to be used for detecting an abnormal parameter of a packet flowing in a network, or when a parameter is maliciously manipulated, an anomalous variable may not be effectively identified in some cases.

More specifically, while cyberattacks, malware, and the like have been developed, it is essential to prevent attacks or the like in advance by employing an intrusion detection system (IDS) or an intrusion prevention system (IPS). The intrusion detection system or the intrusion prevention system detects or prevents fraudulent activity against a computer or a network.

However, as attacks have diversified in recent years, it is becoming harder for the signature-based detection system that has been conventionally used to detect fraudulent communication. As a result, there is a need for an anomaly detection system termed an anomaly-based detection system. The signature-based detection can be applied to only known patterns, whereas anomaly-based detection may detect a novel attack pattern. Nevertheless, there is a problem in which even if an anomaly is detected, what is anomalous cannot be specified and such a multitude of anomaly detection alerts may be issued that a user may be preoccupied with managing the alerts.

The present disclosure provides an anomaly diagnosis method and an anomaly diagnosis apparatus that can effectively identify the cause of an anomaly.

The anomaly diagnosis method of an embodiment of the present disclosure is performed by an anomaly diagnosis apparatus that performs a diagnosis to determine whether an observed value composed of values of multiple variables representing a state of a monitoring target obtained by observing the state of the monitoring target is anomalous. The anomaly diagnosis apparatus includes a processor and a memory. The memory stores an anomaly detection model generated by learning by using multiple observed values. The processor acquires group information indicating one or more groups each constituted by a combination of at least two variables that are related to each other among the multiple variables, acquires the observed value, determines whether the observed value is anomalous by employing the anomaly detection model that is read from the memory, and in a case where the observed value is determined to be anomalous, identifies a group causing an anomaly among the one or more groups in the observed value in accordance with the observed value and the one or more groups indicated by the group information.

In this manner, identifying the group causing an anomaly can be highly accurate for a wide range of issues.

The anomaly detection model may be generated, by using the multiple observed values, by at least one of an autoencoder, a variational autoencoder, and a one-class support vector machine, as the learning.

In this manner, by employing an anomaly detection technique that is known as fine performance, it can be determined whether an observed value is anomalous. In addition, by using the score that is output as a result of anomaly detection, anomaly diagnosis using a natural loss function can be easily achieved.

Furthermore, in the determining of whether the observed value is anomalous, a score may be calculated by feeding the multiple observed values to the anomaly detection model. In a case where the calculated score is equal to or greater than a predetermined first threshold, the acquired multiple observed values may be determined to be anomalous. In a case where the calculated score is less than the first threshold, the acquired multiple observed values may be determined to be non-anomalous.

In this manner, the anomaly of an observed value can be effectively detected.

Moreover, the anomaly detection model may be generated in accordance with a ratio of probability density between normal observed values for learning among the multiple observed values and observed values for diagnosis among the multiple observed values. In the acquiring of the observed value, the multiple observed values may be acquired. In the determining of whether the observed value is anomalous, a score may be calculated by using the anomaly detection model that is read from the memory and the acquired multiple observed values. In a case where the calculated score is equal to or greater than a predetermined first threshold, the acquired multiple observed values may be determined to be anomalous. In a case where the calculated score is less than the first threshold, the acquired multiple observed values may be determined to be non-anomalous.

In this manner, it can be determined whether modeling is difficult because, for example, data in a learning period is not sufficient, or whether data targeted for diagnosis is anomalous as a whole, and if it is anomalous, the variable group including an anomaly can be identified.

Further, in the identifying of the group, a displacement vector may be calculated such that the value of a loss function with respect to the displacement vector is an extremely small value, the value of the loss function being obtained by adding the calculated score and the value of a group regularization term that regularizes respectively the one or more groups indicated by the group information. In the calculated displacement vector, a group including a variable whose value is equal to or greater than a second threshold less than 1 may be identified as the group causing an anomaly.

In this manner, the group causing an anomaly can be effectively identified.

Furthermore, the group regularization term may satisfy Lp regularization where: between groups, $0<p\le1$; and within a group, $p>1$.

In this manner, the group causing an anomaly can be effectively identified.

It should be noted that general or specific embodiments may be implemented as a system, an apparatus, an integrated circuit, a computer program, a computer-readable storage medium such as a CD-ROM, or any selective combination thereof.

Any of the embodiments described below represents a specific example of the present disclosure. The numerical values, shapes, components, steps, order of steps, and the like explained in the following embodiments are mere examples and are not intended to limit the present disclosure. Furthermore, among the components in the following embodiments, components not recited in any of the independent claims indicating the most generic concept of the present disclosure are described as preferable components. In addition, the contents may be mutually combined in all embodiments.

EMBODIMENT

[1. Configuration of Anomaly Diagnosis System]

Firstly, the configuration of an anomaly diagnosis system of this embodiment is schematically described.

FIG. 1 is a schematic diagram illustrating the anomaly diagnosis system according to the embodiment.

More specifically, in FIG. 1, an anomaly diagnosis system 1000 includes an anomaly diagnosis apparatus 100, a server 200, and a monitoring target 300. In the anomaly diagnosis system 1000, the observation data, which is obtained by observing the state of the monitoring target 300, is transmitted from the monitoring target 300 to the server 200. The observation data is received by and accumulated on the server 200. The anomaly diagnosis apparatus 100 obtains the observation data accumulated on the server 200. The anomaly diagnosis apparatus 100 may, for example, obtain regularly or in real time the observation data accumulated on the server 200.

The anomaly diagnosis apparatus 100 determines, by using the obtained observation data, whether an anomalous observed value is included in the observation data. In this manner, the anomaly diagnosis apparatus 100 performs anomaly diagnosis for a monitoring target.

The monitoring target 300 is a system targeted for anomaly diagnosis. The monitoring target 300 is, for example, a chemical plant, a control system, an in-vehicle network system, or the like. Observation data can be obtained from the monitoring target 300 by observation. The observation data indicates observed values composed of multiple variables indicating the state of the monitoring target 300. The observation data is a stream of multiple kinds of data indicating the observed values obtained from the monitoring target 300. The stream of data of the observed values is expressed by, for example, time-series vectors and each dimension represents a value obtained from a sensor or the like that is contained in the monitoring target 300; in other words, the observed values are obtained at different timings. The observed value is obtained by, for example, observation during one predetermined unit of processing and obtained at the timing of ending the processing.

In the anomaly diagnosis system 1000, the anomaly diagnosis apparatus 100, the server 200, and the monitoring target 300 are communicably connected to each other. For example, in the anomaly diagnosis system 1000, the anomaly diagnosis apparatus 100 and the server 200 may be connected via a general network, such as the Internet, or via a dedicated network. Furthermore, in the anomaly diagnosis system 1000, the server 200 and the monitoring target 300 may be connected via a general network, such as the Internet, or a dedicated network.

The anomaly diagnosis system 1000 does not necessarily include the server 200; in other words, the anomaly diagnosis system may have a configuration including the anomaly diagnosis apparatus 100 and the monitoring target 300. In the anomaly diagnosis system 1000 of this case, the observation data, which is obtained by observing the state of the monitoring target 300, is transmitted from the monitoring target 300 directly to the anomaly diagnosis apparatus 100. Moreover, in the anomaly diagnosis system without the server 200, the anomaly diagnosis apparatus 100 and the monitoring target 300 are communicably connected to each other and may be connected via, for example, a general network, such as the Internet, or via a dedicated network.

[2. Hardware Configuration]

[2-1. Configuration of Anomaly Diagnosis Apparatus]

Next, the hardware configuration of the anomaly diagnosis apparatus 100 is described with reference to FIG. 2.

Figure 2:
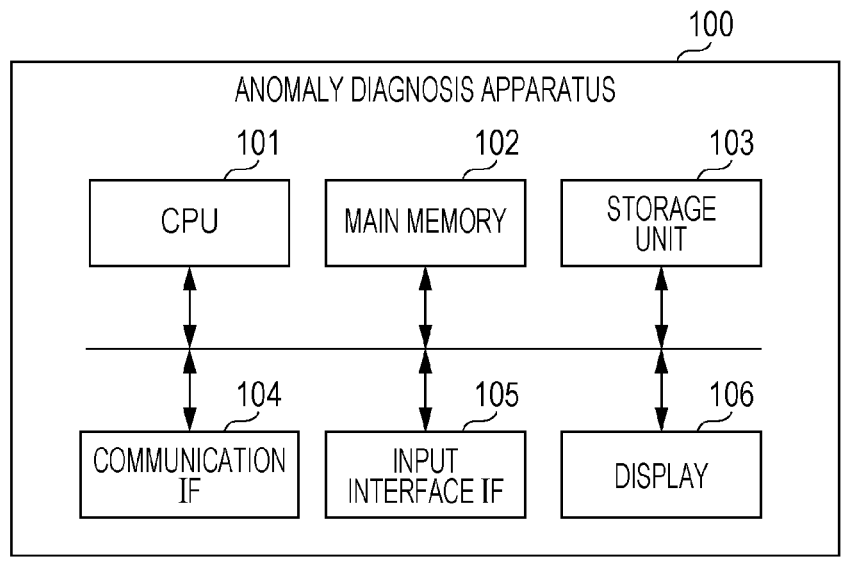
FIG. 2 is a block diagram illustrating an example of a hardware configuration of an anomaly diagnosis apparatus according to the embodiment.

FIG. 2 is a block diagram illustrating an example of a hardware configuration of the anomaly diagnosis apparatus according to the embodiment.

As illustrated in FIG. 2, the anomaly diagnosis apparatus 100 includes as the hardware configuration a central processing unit (CPU) 101, a main memory 102, a storage unit 103, a communication interface (IF) 104, an input interface (IF) 105, and a display 106.

The CPU 101 is an example of a processor that executes a control program stored in the storage unit 103 or the like.

The main memory 102 is an example of a volatile storage area that is used as a work area when the CPU 101 executes the control program, that is, a memory.

The storage unit 103 is an example of a non-volatile storage area that stores the control program, contents, and the like, that is, a memory.

The communication IF 104 is a communication interface that communicates with the server 200 via a communication network. The communication IF 104 is, for example, a wired local area network (LAN) interface. The communication IF 104 may be a wireless LAN interface. Furthermore, the communication IF 104 is not limited to a LAN interface, and may be any communication interface that is able to establish a communication connection to a communication network.

The input IF 105 is constituted by input devices, such as a numeric keypad, a keyboard, and a mouse.

The display 106 is a display device that displays results of processing performed by the CPU 101. The display 106 is, for example, a liquid crystal display, or an organic EL display.

[2-2. Configuration of Monitoring Target]

Next, as an example of the monitoring target 300 of the anomaly diagnosis system 1000, the case of obtaining observation data from a control system 310 is described.

Figure 3:
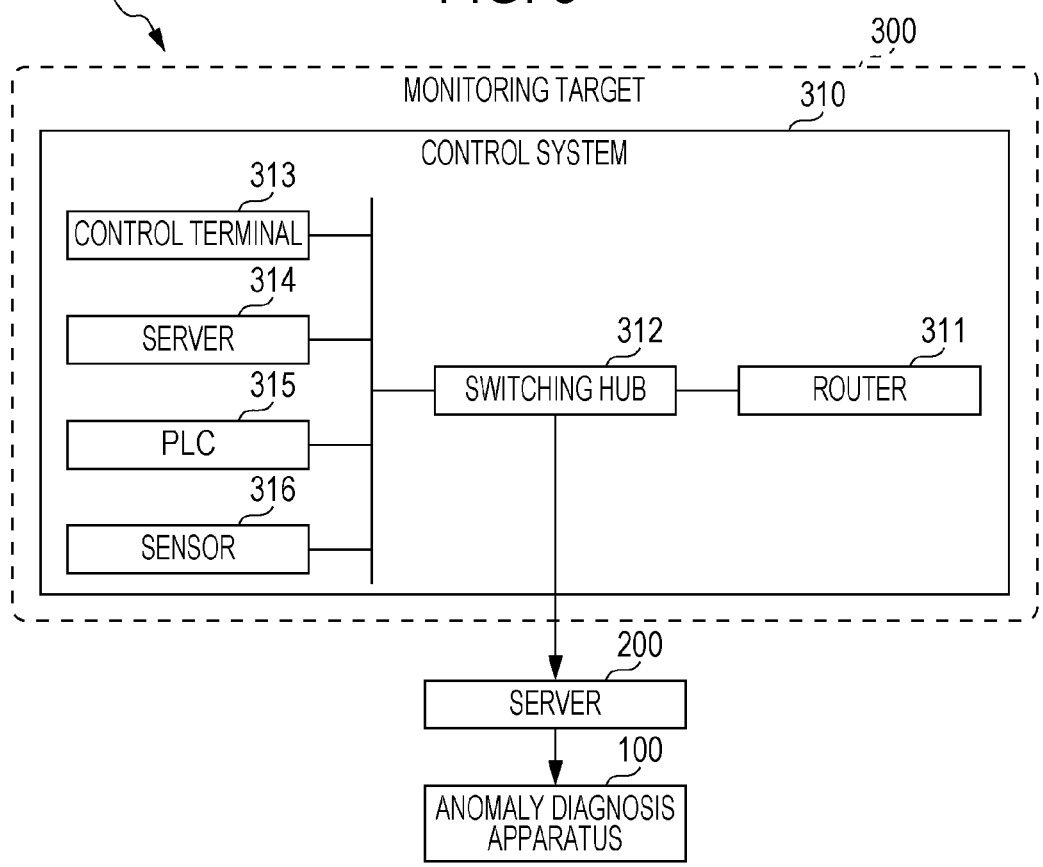
FIG. 3 is a block diagram illustrating an example of a monitoring target of the anomaly diagnosis system according to the embodiment.

FIG. 3 is a block diagram illustrating an example of the monitoring target of the anomaly diagnosis system according to this embodiment. In FIG. 3, in the anomaly diagnosis system 1000, the monitoring target 300 is, for example, the control system 310. The observation data obtained by observing the control system 310 is transmitted to the server 200. The observation data transmitted to and accumulated on the server 200 is in turn transmitted to the anomaly diagnosis apparatus 100 and used for anomaly diagnosis of an observed value performed by the anomaly diagnosis apparatus 100.

The control system 310 includes a router 311, a switching hub 312, a control terminal 313, a server 314, a programmable logic controller (PLC) 315, and a sensor 316.

The router 311 is a communication device that mediates data transmission and reception between the control system 310 and other networks. The router 311 analyzes the received data and controls data transfer by, for example, selecting a data transfer path in accordance with the analysis result.

The switching hub 312 forms communication connections with the router 311, the control terminal 313, the server 314, the PLC 315, and the sensor 316 and transfers received data to one of the connected devices in accordance with destination information contained in the received data. The switching hub 312 includes, for example, a mirror port that outputs a copy of received data. The switching hub 312 is connected to the server 200 via the mirror port. The observation data is extracted via the mirror port of the switching hub 312 and transmitted to the server 200.

The control terminal 313 is, for example, a personal computer (PC), a tablet terminal, or a smartphone.

The server 314 is a computer and, for example, provides the control terminal 313 with a predetermined function, data, or the like.

The PLC 315 is a control device for controlling various devices.

The sensor 316 may be any of a variety of sensors and, for example, converts various physical quantities to electrical signals.

[3. Functional Configuration of Anomaly Diagnosis System]

Next, the functional configuration of the anomaly diagnosis system 1000 is described with reference to FIG. 4.

Figure 4:
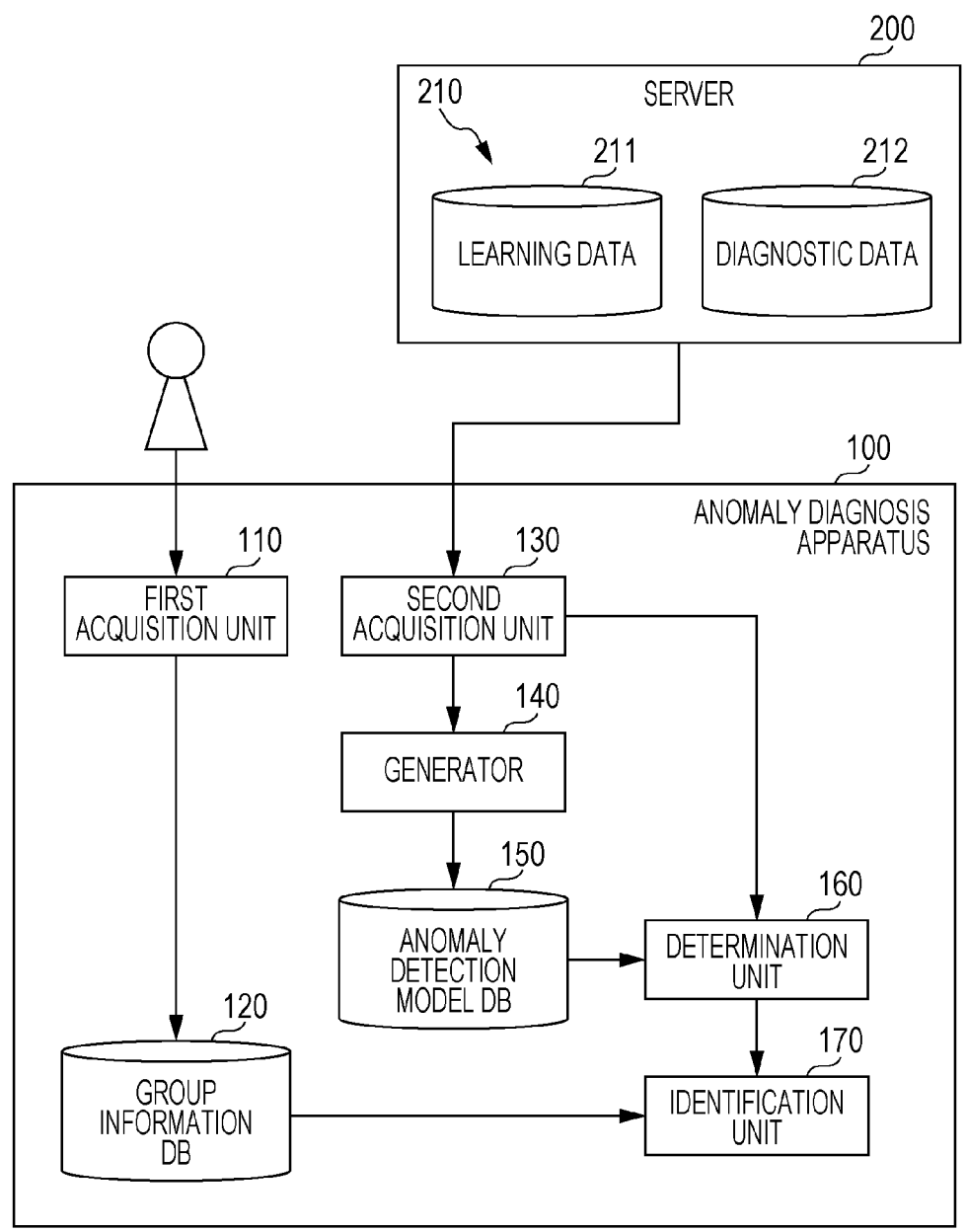
FIG. 4 is a block diagram illustrating an example of a functional configuration of the anomaly diagnosis apparatus according to the embodiment.

FIG. 4 is a block diagram illustrating an example of the functional configuration of the anomaly diagnosis apparatus according to this embodiment.

Observation data 210 accumulated on the server 200 includes learning data 211 and diagnostic data 212.

The learning data 211 is data, in the obtained observation data 210, for generating an anomaly detection model for machine learning. The diagnostic data 212 is data, in the obtained observation data 210, that is targeted for anomaly diagnosis in which it is determined by using the generated anomaly detection model whether the observation data 210 obtained from the monitoring target 300 is anomalous. The obtained observation data 210 containing not only normal data but also anomalous data can be used as the learning data 211. For example, the learning data 211 may be obtained in a predetermined period at the start of acquiring the observation data 210, while the diagnostic data 212 may be obtained in the period after the predetermined period in which the learning data 211 has been obtained.

The anomaly diagnosis apparatus 100 includes a first acquisition unit 110, a group information database (DB) 120, a second acquisition unit 130, a generator 140, an anomaly detection model database (DB) 150, a determination unit 160, and an identification unit 170.

The first acquisition unit 110 acquires group information indicating one or more groups each constituted by a combination of at least two variables that are related to each other among variables indicating the state of the monitoring target 300. The first acquisition unit 110 acquires the group information by, for example, receiving an input that is entered by a user and that indicates a group. The first acquisition unit 110 is implemented as, for example, the input IF 105, the display 106, and the like.

The group information DB 120 stores the group information acquired by the first acquisition unit 110. The group information DB 120 is implemented as, for example, the storage unit 103 and the like.

The second acquisition unit 130 acquires an observed value contained in the observation data 210 by obtaining the observation data 210 from the server 200. The second acquisition unit 130 is implemented as, for example, the communication IF 104 and the like.

The generator 140 generates the anomaly detection model by performing machine learning by using the learning data 211 in the observation data 210 acquired by the second acquisition unit 130. The generation of the anomaly detection model performed by employing machine learning is typically formulated as a task of unsupervised learning. The generator 140 generates the anomaly detection model for detecting an anomaly by, for example, estimating probability density distribution of data by using the learning data 211.

The learning data 211 includes, for example, a large amount of unlabeled data obtained by observing the monitoring target 300 in a predetermined period. A specific example of generation processing for the anomaly detection model performed by the generator 140 will be described later. The generator 140 is implemented as, for example, the CPU 101, the main memory 102, the storage unit 103, and the like.

The anomaly detection model generated by the generator 140 is stored in the anomaly detection model DB 150. The anomaly detection model DB 150 is implemented as, for example, a storage unit and the like.

The determination unit 160 loads the anomaly detection model stored in the anomaly detection model DB 150. The determination unit 160 determines by employing the loaded anomaly detection model whether the diagnostic data 212 in the observation data 210 acquired by the second acquisition unit 130 is anomalous. The determination unit 160 may, for example, perform determination separately or collectively for the observed values contained in the diagnostic data 212. The determination unit 160 determines whether the diagnostic data 212 is anomalous in accordance with whether the probability density of the diagnostic data 212 with respect to the anomaly detection model exceeds a predetermined threshold. For example, in a case where the above-described obtained probability density is a negative logarithm, the determination unit 160 determines that the diagnostic data 212, from which the probability density is obtained, includes an anomaly. The method of anomaly determination performed by the determination unit 160 is not limited to the above-described method. A specific example of determination processing performed by the determination unit 160 will be described later. The determination unit 160 is implemented as, for example, the CPU 101, the main memory 102, the storage unit 103, and the like.

In a case where the determination unit 160 determines that the diagnostic data 212 is anomalous, the identification unit 170 identifies the group causing the anomaly among one or more groups in the diagnostic data 212 in accordance with the diagnostic data 212 that has been determined to be anomalous and one or more groups indicated by the group information stored in the group information DB 120. The identification unit 170 performs anomaly diagnosis by using the diagnostic data 212 that has been determined to be anomalous and the group information. The anomaly diagnosis here means diagnosis to determine which variable group is anomalous in the diagnostic data 212 having been determined by the determination unit 160 to be anomalous. A specific example of anomaly diagnosis performed by the identification unit 170 will be described later.

The identification unit 170 may generate in advance an anomaly diagnosis model for anomaly diagnosis by extracting an anomalous variable group by using the anomaly detection model in the anomaly detection model DB 150 and the group information in the group information DB 120. In this case, the identification unit 170 performs anomaly diagnosis for the diagnostic data 212 having been determined by the determination unit 160 to be anomalous by employing the anomaly diagnosis model generated in advance.

The identification unit 170 is implemented as the CPU 101, the main memory 102, the storage unit 103, and the like.

The anomaly diagnosis apparatus 100 has a configuration including the generator 140 that generates the anomaly detection model, but is not limited to including the generator 140; in other words, the apparatus that generates an anomaly detection model by using learning data may be implemented as an apparatus other than the anomaly diagnosis apparatus 100, and the anomaly diagnosis apparatus 100 may obtain the anomaly detection model from the apparatus.

Given that the anomaly diagnosis apparatus 100 is able to obtain the observation data 210, the anomaly diagnosis system 1000 does not necessarily include the monitoring target 300.

[4. Example of Observation Data]

Next, details of the observation data 210 is described with reference to FIG. 5.

FIG. 5 is a table illustrating an example of observation data obtained from a monitoring target.

In FIG. 5, the observation data 210 is composed of observed values 1 to 7 that are each observed in an individual session and feature items about the monitoring target 300: session duration, protocol type, service name, flag, amount of data transmitted from server, amount of data received by server, number of recent communication activities of server, recent server-error rate, login status, root shell flag, and number of instructions executed at root. The Items illustrated in FIG. 5 indicate variables each representing the state of a monitoring target, and the observed values 1 to 7 indicate observed values each obtained at a different timing. For example, each of the observed values 1 to 7 is obtained by observing the state represented by each of the above-described items about the monitoring target 300 in a single session. Accordingly, a parameter for an observed value n (n is a natural number) is observed during processing in a session n (n is a natural number).

The items for observed values in the observation data 210 in FIG. 5 are examples of features obtained by observing a network. These features are some of features provided in the NSL-KDD data set, which is discussed in M. Tavallaee, E. Bagheri, W. Lu, and A. Ghorbani, "A Detailed Analysis of the KDD CUP 99 Data Set," Submitted to Second IEEE Symposium on Computational Intelligence for Security and Defense Applications (CISDA), 2009. These features are obtained by observing various types of variables of a monitoring target such as data of a packet flowing in a network.

The observation data 210 in FIG. 5 includes, as the observed values, real numbers that are values measured for session duration, amount of data transmitted from server, amount of data received by server, number of recent communication activities of server, recent server-error rate, and number of instructions executed at root, and raw values representing category information observed for protocol type, service name, and flag, and flag information observed for login status and root shell flag. It is difficult for the anomaly diagnosis apparatus 100 to use among the observed values, for example, raw values of category information for each processing operation such as anomaly detection, anomaly diagnosis, or the like. Hence, the observed values for category information or the like are converted into vector values by employing 1-of-N encoding. The conversion into vector values may be performed in the server 200 or the anomaly diagnosis apparatus 100.

To be specific, 1-of-N encoding is encoding in which an individual dimension is assigned to each of N kinds of observed values; and a numerical value for each of the individual dimensions is determined such that only the dimension assigned to one observed value is 1 and other dimensions are 0, thereby converting an observed value, such as category information, into a vector value.

For example, in a case where the 1-of-N encoding is performed for three kinds of observed values: sunny, rainy, and cloudy, since N=3, conversion is performed such that vector values expressed by three dimensions are assigned to the observed values; for example, sunny is (1,0,0), rainy is (0,1,0), and cloudy is (0,0,1). In this manner, vector values can be obtained from the observed values of sunny, rainy, and cloudy.

Furthermore, the observed value for a flag of two values such as ON/OFF may be converted into a numerical value such that the observed value is expressed by a feature quantity such as 1 for ON or 0 for OFF.

[5. Example of Group Setting]

Next, a group setting method is described in detail with reference to FIG. 6A and FIG. 6B.

Figure 6A:
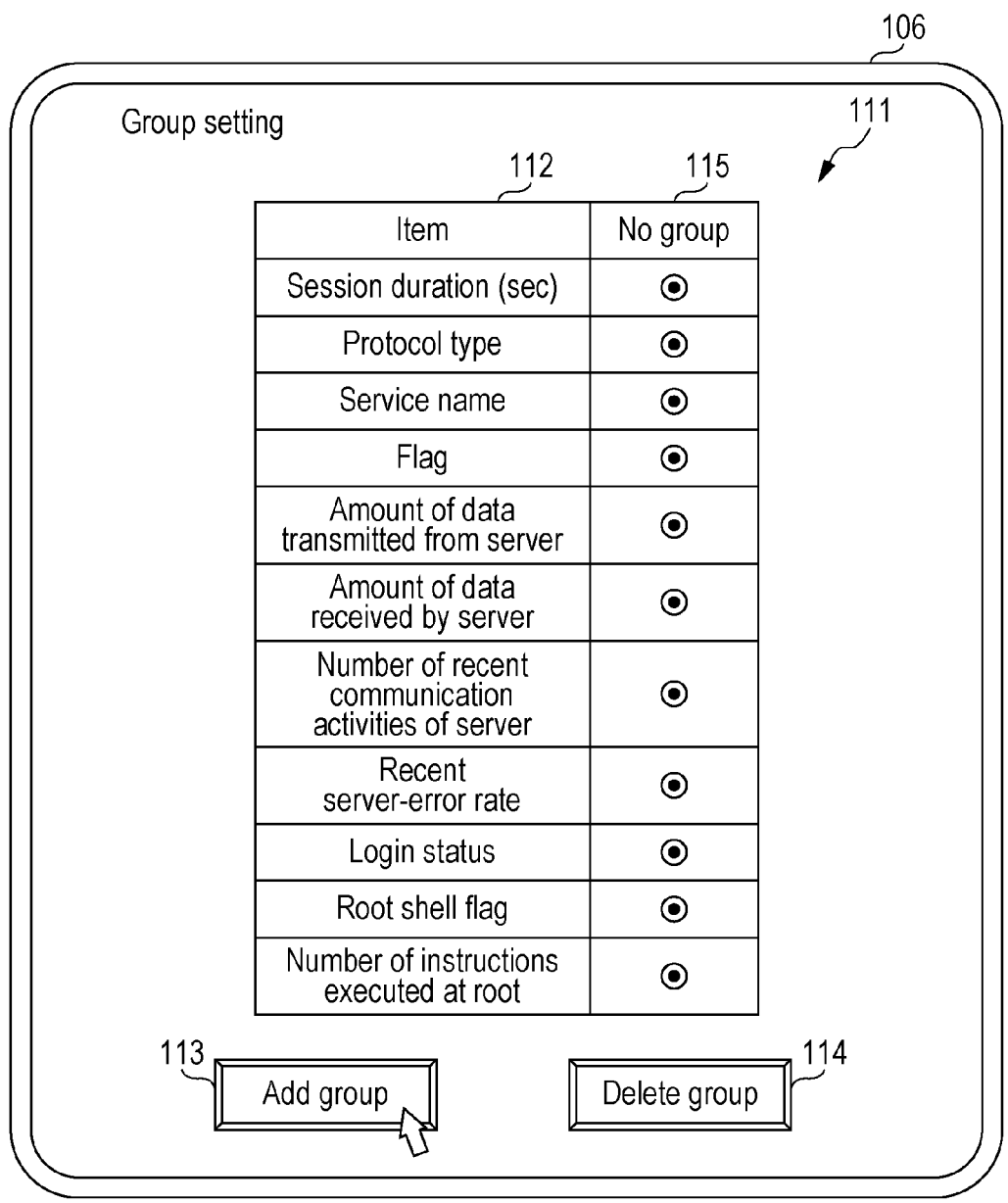
FIG. 6A illustrates an example of a user interface (UI) displayed on a display to configure group settings for the anomaly diagnosis apparatus according to the embodiment.

FIG. 6A and FIG. 6B illustrate examples of a UI displayed on a display to configure group settings for the anomaly diagnosis apparatus according to the embodiment.

In FIG. 6A, a UI 111 for setting a group constituted by a combination of at least two variables is displayed on the display 106. The UI 111 is constituted by the item 112, a group addition button 113, and a group deletion button 114. In the item 112, the multiple items included in the observation data 210 obtained from the monitoring target 300 are displayed. More specifically, the item 112 includes session duration, protocol type, service name, flag, amount of data transmitted from server, amount of data received by server, number of recent communication activities of server, recent server-error rate, login status, root shell flag, and number of instructions executed at root. A user configures a group setting for those in the item 112 by performing inputs on the UI 111 by using the input IF 105.

FIG. 6A illustrates the initial state of the UI 111, and checkboxes for setting No group 115, which indicates that a corresponding item in the item 112 does not belong to any group, are displayed.

When grouping is performed, a user can add a group by pressing the group addition button 113, so that a setting for items belonging to the group can be configured.

FIG. 6B illustrates a UI 111a that is displayed in a case where "group 1a" and "group 2a" are added as groups by pressing the group addition button 113.

In the UI 111a, "session duration", "amount of data transmitted from server", and "amount of data received by server" are set as "group 1a". Since "session duration" increases when the amount of transmitted and received data increases, "session duration", "amount of data transmitted from server", and "amount of data received by server" are related to one another. Accordingly, "session duration", "amount of data transmitted from server", and "amount of data received by server" are grouped together.

Furthermore, in the UI 111a, "root shell flag" and "number of instructions executed at root" are set as "group 2a". Since "number of instructions executed at root" is at least one when "root shell flag" is ON, "root shell flag" and "number of instructions executed at root" are related to each other. Accordingly, "root shell flag" and "number of instructions executed at root" are grouped together.

In the group setting for the item 112 by using the UIs 111 and 111a, the items each are included in a single group among the groups including "no group" and does not belong to more than one group.

Moreover, in a case where, instead of "protocol type" that is an observed value in the item 112, "tcp", "udp", and "icmp" are used as three kinds of observed values, in other words, "tcp", "udp", and "icmp" are used as items instead of "protocol type", these three items may be set for the same group.

When deleting a set group, by pressing the group deletion button 114 while selecting a group to be deleted, the selected group can be deleted. In the UIs 111 and 111a, for example, when an input for selecting "group 1*a*", "group 2*a*", or "no group" is received, highlighting the group selected by the input may indicate that the group is selected.

[6. Generation Processing]

Next, the generation processing for the anomaly detection model performed by the generator 140 is described in detail.

As an example of generation of the anomaly detection model, the case of employing an autoencoder is described with reference to FIG. 7.

Figure 7:
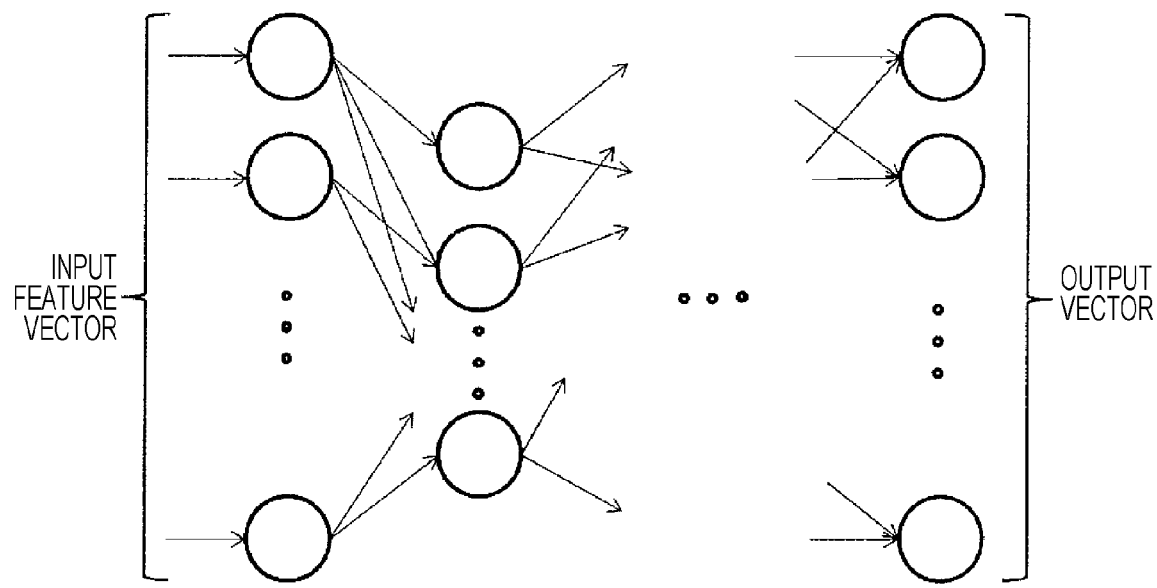
FIG. 7 illustrates an autoencoder according to the embodiment.

FIG. 7 illustrates an autoencoder according to the embodiment.

As illustrated in FIG. 7, the autoencoder is a type of neural network and extracts the amount of information on a feature representing an input by employing dimensionality reduction. The autoencoder is used for machine learning in which, in a neural network with at least three layer that includes one or more intermediate layers of dimensions lower than the dimension of an input layer and the dimension of an output layer, weighting is determined such that the value of an input feature vector and the value of an output vector are equal to each other.

Figure 8:
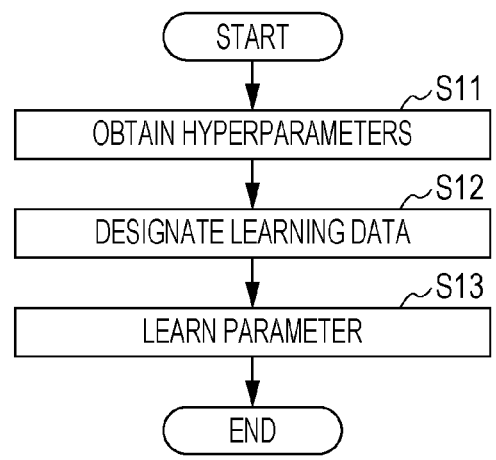
FIG. 8 is a flowchart illustrating an example of generation processing for an anomaly detection model according to the embodiment.

FIG. 8 is a flowchart illustrating an example of generation processing for the anomaly detection model according to the embodiment.

The generator 140 obtains hyperparameters for the autoencoder (S11). The hyperparameters are, for example, the number of nodes in intermediate layers of the autoencoder, a learning rate, a parameter for a dropout function. Dropout is a technique for randomly zeroing out the value of an intermediate node when causing the autoencoder to learn. The generator 140 may obtain hyperparameters by receiving an input entered by a user via the input IF 105, obtain from the storage unit 103 hyperparameters stored in advance in the storage unit 103, or obtain hyperparameters from external hardware by using the communication IF 104.

The generator 140 obtains from the second acquisition unit 130 the learning data 211 to be learnt by the autoencoder (S12).

The generator 140 causes the autoencoder to perform learning and, by adjusting a weighting parameter of the autoencoder, obtains the weighting parameter with which the learning data 211 is appropriately compressed or uncompressed (S13). By applying the obtained weighting parameter to the autoencoder to which the hyperparameters obtained in step S11 have been set, the generator 140 generates the anomaly detection model.

[7. Determination Processing]

Next, determination processing performed by the determination unit 160 by using the generated anomaly detection model is described in detail.

Figure 9:
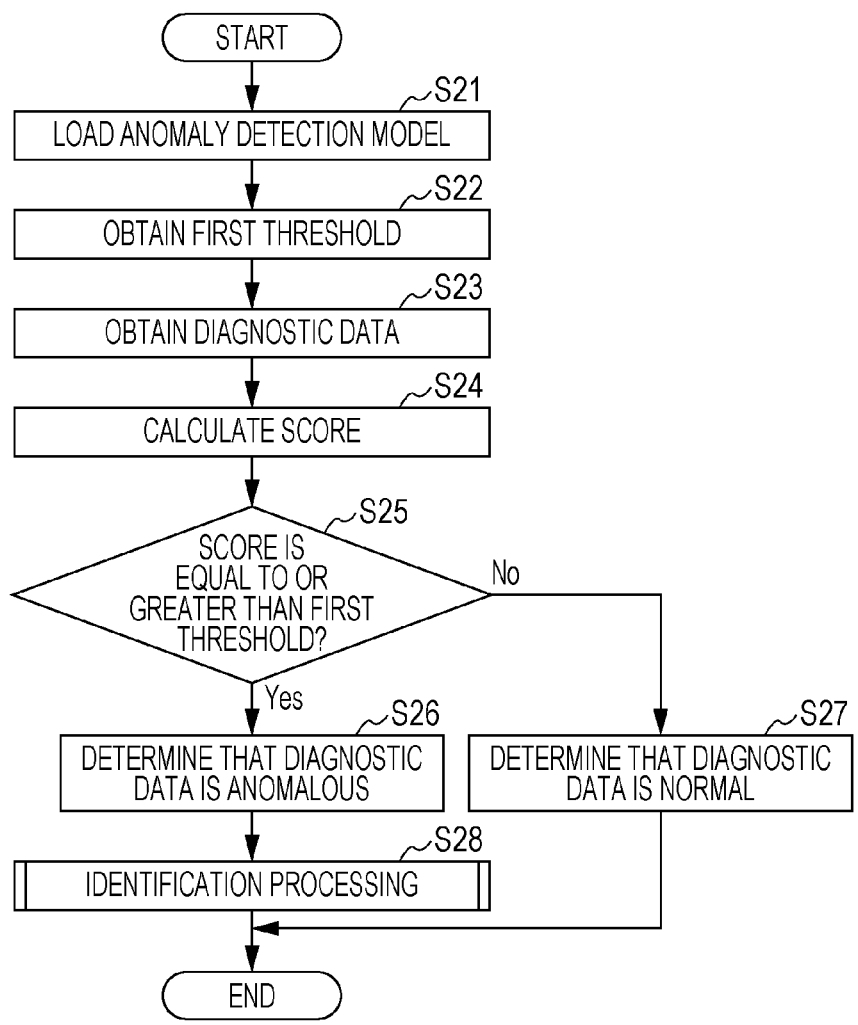
FIG. 9 is a flowchart illustrating an example of determination processing performed by employing the anomaly detection model according to the embodiment.

FIG. 9 is a flowchart illustrating an example of determination processing performed by employing the anomaly detection model according to the embodiment. Determination of whether it is anomalous is performed by using the autoencoder.

The determination unit 160 loads the anomaly detection model from the anomaly detection model DB 150 (S21). The determination unit 160 loads from the anomaly detection model DB 150, for example, the learned autoencoder.

The determination unit 160 obtains a first threshold for determining that a score is anomalous (S22). The determination unit 160 may obtain the first threshold by, for example, calculating the first threshold by employing a cross-validation method. The cross-validation method, for example, partitions multiple kinds of the learning data 211 at the ratio of 4 to 1, and uses one part (4 of 4 to 1) for learning of the partitioned multiple kinds of the learning data 211 and the other part (1 of 4 to 1) for validation. By causing the autoencoder to learn one part of the learning data 211 partitioned for learning and the learned autoencoder to perform the anomaly determination for the other part of the learning data 211 partitioned for validation, the determination unit 160 may calculate the first threshold such that the probability that a score is determined in the anomaly determination to be anomalous is about 0.01%. Furthermore, the determination unit 160 may obtain the first threshold by receiving an input entered by a user via the input IF 105, obtain from the storage unit 103 the first threshold stored in advance in the storage unit 103, or obtain the first threshold from external hardware by using the communication IF 104.

The determination unit 160 obtains the diagnostic data 212 that has been acquired by the second acquisition unit 130 (S23).

The determination unit 160 calculates a score by feeding the diagnostic data 212 acquired by the second acquisition unit 130 into the leaned autoencoder (S24). The determination unit 160 calculates a score in accordance with, for example, Equation 1.

$$J(x) = \frac{1}{m}\sum_{i=1}^{m}(x_i - y_i)^2 \quad \text{(Equation 1)}$$

In Equation 1, x is an input vector of the autoencoder; i represents the ith dimension of x and the ith dimension of a output vector of the autoencoder; m is the number of dimensions of an input vector and the number of dimensions of an output vector; and score J(x) is the mean squared error with respect to an output vector when diagnostic data is fed into the autoencoder.

The determination unit 160 determines whether the calculated score is equal to or greater than the first threshold (S25).

In a case where the score is equal to or greater than the first threshold (Yes in S25), the determination unit 160 determines that the fed diagnostic data 212 is anomalous (S26) and notifies the identification unit 170 of the determination result.

In a case where the score is less than the first threshold (No in S25), the determination unit 160 determines that the fed diagnostic data 212 is normal (S27).

The identification unit 170 performs processing for identifying the group causing an anomaly by using the calculated score and the group information (S28). The details of the identification processing are described below.

[8. Identification Processing]

Next, processing for identifying the group causing an anomaly is described in detail.

Figure 10:
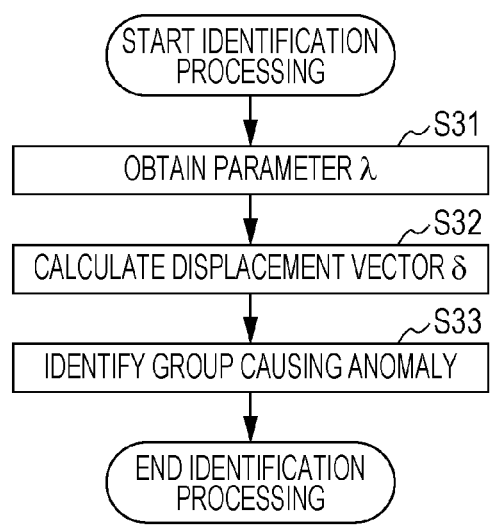
FIG. 10 is a flowchart illustrating an example of processing for identifying the group causing an anomaly.

FIG. 10 is a flowchart illustrating an example of processing for identifying the group causing an anomaly according to the embodiment.

The identification unit 170 performs the processing for identifying the group causing an anomaly by using the score of the diagnostic data 212 that has been determined by the determination unit 160 to be anomalous. Equation 2 is a loss function that is used for identifying the group causing an anomaly.

$$L(\delta) = J(x + \delta) + \lambda \sum_{i=1}^{n_g} \sqrt{\frac{1}{d_i}\sum_{j=1}^{d_i} \delta_{g_{ij}}^2} \quad \text{(Equation 2)}$$

In Equation 2, δ is a displacement vector having the same number of dimensions as that of an input vector; λ is a regularization parameter; $n_g$ is the number of variable groups; $d_i$ is the number of variables belonging to a variable group $g_i$; and J(x) is a score.

The loss function is defined as the sum of a score and the score obtained by adding the L2 norms of displacements δ of respective groups, the displacements δ resulting from group regularization with respect to an original input value, as expressed by Equation 2.

The group regularization term in Equation 2 satisfies Lp regularization where between groups: p=1; and within a group: p=2. The group regularization term is not limited to Equation 2, but is applicable as long as it satisfies Lp regularization where: between groups, 0<p≤1; and within a group, p>1.

In addition, in Equation 2 the group regularization is weighted by being multiplied by a parameter λ.

The identification unit 170 obtains the parameter λ (S31). The identification unit 170 may obtain a given value as the parameter λ or obtain the parameter λ by performing calculation by employing a cross-validation method. Furthermore, the identification unit 170 may obtain the parameter λ by receiving an input entered by a user via the input IF 105, obtain from the storage unit 103 the parameter λ stored in advance in the storage unit 103, or obtain the parameter λ from external hardware by using the communication IF 104.

The identification unit 170 calculates the displacement vector δ with which the value of the loss function of Equation 2 is extremely small by searching with the initial value 0 by employing the gradient method (S32); in other words, the identification unit 170 calculates such a displacement vector δ that the value of the loss function with respect to the displacement vector δ is an extremely small value, the value of the loss function being obtained by adding the score that is determined by the determination unit 160 to be equal to or greater than the first threshold and the value of the group regularization term that regularizes respectively one or more groups indicated by the group information.

The identification unit 170 identifies as the group causing an anomaly the group including, among variables of the observed values, a variable that is not zero or a variable whose absolute value is equal to or greater than a second threshold ϵ, where the second thresholds is an extremely small positive number ϵ (S33). The second threshold ϵ is a value greater than 0 and less than 1.

[9. Advantageous Effects, etc.]

With the anomaly diagnosis method according to this embodiment, since in an observed value composed of values obtained by observing multiple variables the variables are grouped in advance, identifying the group causing an anomaly can be highly accurate for a wide range of issues.

Furthermore, with the anomaly diagnosis method, by employing an anomaly detection technique that has been known as fine performance such as the autoencoder, it can be determined whether an observed value is anomalous. Moreover, by using the score that is output as a result of anomaly detection, anomaly diagnosis using a natural loss function can be easily carried out.

Further, with the anomaly diagnosis method, the group causing an anomaly can be effectively identified because the group that is of a displacement vector with which the value of the loss function is extremely small and that includes a variable whose absolute value is equal to or greater than the second threshold is identified as the group causing an anomaly.

Furthermore, with the anomaly diagnosis method, the group causing an anomaly can be effectively identified because the group regularization term satisfies Lp regularization where: between groups, 0<p≤1; and within a group, p >1.

[10. Other Modified Exemplary Embodiments]

It should be noted that the present disclosure has been described in accordance with the above-described embodiment, the present disclosure is, however, not limited to the above-described embodiment. The following cases are also encompassed in the present disclosure.

(1) In the above-described embodiment, the configuration of the control system as a monitoring target is described. In the above description, anomaly determination is performed by using observation data obtained by the switching hub, but the present disclosure is not limited to this manner. For example, anomaly determination may be performed by using observation data composed of observed values obtained from various sensors in a chemical plant.

(2) In the anomaly diagnosis apparatus 100 according to the above-described embodiment, conversion into a numerical value is performed by employing 1-of-N encoding as a method for conversion into a vector value, but the encoding method is not limited to this manner. For example, there can be considered as the encoding method a method for conversion into a vector of real number values of specific number of dimensions such as the method employing embedding that is discussed in Mikolov, Tomas, et al. "Distributed representations of words and phrases and their compositionality." Advances in neural information processing systems. 2013, or the method for encoding by using a random number. As such, generation of the anomaly detection model or anomaly determination can be more highly accurate. Additionally, even in a case where a new category is introduced, conversion into a vector can be performed without increasing dimensions for variables.

(3) In the anomaly diagnosis apparatus 100 according to the above-described embodiment, variables are grouped in accordance with the input entered by a user via the input IF 105, but grouping is not limited to this manner. A display indicating the amount of mutual information between variables may be further added to the UIs 111 and 111a. Furthermore, when an input entered by a user via the input IF 105 to indicate the number of groups that the user desires to form is received, in accordance with the number of groups indicated by the input, grouping may be automatically performed by employing the method discussed in Yang, Sen, et al. "Feature grouping and selection over an undirected graph." Graph Embedding for Pattern Analysis. Springer New York, 2013. 27-43. or the method discussed in Song, Jingping, Zhiliang Zhu, and Chris Price. "Feature grouping for intrusion detection system based on hierarchical clustering." International Conference on Availability, Reliability, and Security. Springer International Publishing, 2014.

Moreover, in terms of grouping of variables, in a case where the value of a function that uses a given variable as an argument, for example, an identity function, is another variable, or in a case where sin θ and cos θ, which are the trigonometric functions of a given angle θ, are other variables, the variables are grouped in accordance with the magnitude of correlation between the variables.

(4) In the above-described embodiment, anomaly determination employing the autoencoder is performed, but anomaly determination may be performed by employing other techniques. For example, anomaly determination may be performed by employing a technique for determining an anomaly in a case where the value of a probability density function estimated by employing kernel density estimation is less than a given threshold or performed by employing a one-class support vector machine (SVM) or a variational autoencoder instead of the autoencoder.

When the one-class SVM is employed, anomaly determination is performed by determining a separating plane for determining whether it is normal or anomalous in a feature space where an input vector is mapped by employing a kernel method.

When the variational autoencoder is employed, to calculate the likelihood that input data is generated, the loss function used for identifying the variable group causing an anomaly may be according to not the mean squared error but the negative log-likelihood.

In addition, anomaly determination may be performed by employing density ratio estimation that estimates the ratio of probability density between a sample group assumed to be normal and another sample group targeted for anomaly determination. In this case, in the anomaly diagnosis apparatus 100, the generator 140 generates the anomaly detection model in accordance with the ratio of probability density between learning data and diagnostic data on the basis of multiple kinds of normal observation data for learning and multiple kinds of observation data for diagnosis. The above-described embodiment and the case of generating the anomaly detection model in accordance with the ratio of probability density differ in that, in the above-described embodiment, the generator 140 uses the observation data 210 containing anomalous data as the learning data 211, but in the case of generating the anomaly detection model in accordance with the ratio of probability density, the learning data 211 constituted by only normal data without anomalous data, and in addition, the diagnostic data 212 are used. The determination unit 160 calculates a score by employing for multiple kinds of observation data for diagnosis the anomaly detection model generated by the generator 140 in accordance with the ratio of probability density. Subsequently, in a case where the calculated score is equal to or greater than a predetermined first threshold, the determination unit 160 determines that the obtained observed values are anomalous. Conversely, in a case where the calculated score is less than the first threshold, the determination unit 160 determines that the obtained observed values are non-anomalous.

(5) In the above-described embodiment, group regularization is employed as the method for identifying the variable group causing an anomaly, but other various methods can be considered. For example, the variable group for which the mean squared error of the output value of the autoencoder exceeds a predetermined value may be identified as the group causing an anomaly. A variable group for which the score calculated by employing the gradient method regarding only the variable group as variables while fixing variables other than the variable group is smallest may be identified as the group causing an anomaly.

It should be noted that in the above-described embodiments, each component may be constituted by dedicated hardware or implemented by executing a software program suitable for the each component. Each component may be implemented by a program execution unit such as a CPU, a processor, or the like reading and executing a software program recorded in a storage medium such as a hard disk, a semiconductor memory, or the like. Here, the software that implements the anomaly diagnosis method or the like of the above-described embodiments is a program described below.

The program causes a computer to execute an anomaly diagnosis method performed by an anomaly diagnosis apparatus that performs a diagnosis to determine whether an observed value composed of values of multiple variables representing a state of a monitoring target obtained by observing the state of the monitoring target is anomalous. The anomaly diagnosis apparatus includes a processor and a memory. The memory stores an anomaly detection model generated by learning by using multiple observed values. The processor acquires group information indicating one or more groups each constituted by a combination of at least two variables that are related to each other among the multiple variables, acquires the observed value, determines whether the observed value is anomalous by employing the anomaly detection model that is read from the memory, and in a case where the observed value is determined to be anomalous, identifies a group causing an anomaly among the one or more groups in the observed value in accordance with the observed value and the one or more groups indicated by the group information.

Although the anomaly diagnosis method and the anomaly diagnosis apparatus according to one or more aspects of the present disclosure are described as above in accordance with the embodiments, the present disclosure is not limited to the embodiments. All modifications made to the embodiments and all forms composed of any combination of components in different embodiments that occur to those skilled in the art are intended to be embraced within one or more aspects of the present disclosure without departing from the spirit and scope of the present disclosure.

The present disclosure is useful for identifying a variable contributing to an anomaly in multidimensional information.

What is claimed is:

1. An anomaly diagnosis method performed by an anomaly diagnosis apparatus that performs a diagnosis to determine whether an observed value composed of values of multiple variables representing a state of a monitoring target obtained by observing the state of the monitoring target is anomalous, wherein
the anomaly diagnosis apparatus includes a processor and a memory,
the memory stores an anomaly detection model generated by learning by using multiple first observed values, with each of the first observed values including values of multiple variables of a first observed value representing a first state of the monitoring target, and
the processor
acquires a second observed value, the second observed value including values of multiple variables of the second observed value representing a second state of the monitoring target,
acquires group information indicating one or more groups in the second observed value, each group constituted by a combination of at least two variables that are related to each other among the multiple variables of the second observed value,
determines whether the second observed value is anomalous by employing the anomaly detection model that is read from the memory, and
in a case where the second observed value is determined to be anomalous, identifies a group including the combination of at least two variables causing an anomaly among the one or more groups in the second observed value in accordance with the second observed value and the one or more groups indicated by the acquired group information.

2. The anomaly diagnosis method according to claim 1, wherein the anomaly detection model is generated, by using the multiple first observed values, by at least one of an autoencoder, a variational autoencoder, and a one-class support vector machine, as the learning.

3. The anomaly diagnosis method according to claim 2, wherein in the determining of whether the second observed value is anomalous,
- a score is calculated by feeding multiple second observed values to the anomaly detection model,
- in a case where the calculated score is equal to or greater than a predetermined first threshold, the multiple second observed values are determined to be anomalous,
- in a case where the calculated score is less than the first threshold, the multiple second observed values are determined to be non-anomalous.

4. The anomaly diagnosis method according to claim 3, wherein
in the identifying of the group,
- a displacement vector is calculated such that a value of a loss function for an input vector added by the displacement vector is a local minimum, the value of the loss function being obtained by adding the calculated score and a value of a group regularization term that regularizes respectively the one or more groups indicated by the group information, and
- in the calculated displacement vector, a group including a variable whose value is equal to or greater than a second threshold less than 1 is identified as a group causing an anomaly.

5. The anomaly diagnosis method according to claim 4, wherein the group regularization term satisfies Lp regularization where: between groups, $0 < p \leq 1$; and within a group, $p > 1$.

6. The anomaly diagnosis method according to claim 1, wherein
the anomaly detection model is generated in accordance with a ratio of probability density between normal first observed values for learning among the multiple first observed values and second observed values for diagnosis among multiple second observed values,
in the acquiring of the second observed value, the multiple second observed values are acquired, and
in the determining of whether the second observed value is anomalous,
- a score is calculated by using the anomaly detection model that is read from the memory and the multiple second observed values,
- in a case where the calculated score is equal to or greater than a predetermined first threshold, the acquired multiple second observed values are determined to be anomalous, and
- in a case where the calculated score is less than the first threshold, the multiple second observed values are determined to be non-anomalous.

7. The anomaly diagnosis method according to claim 1, wherein
a variable belongs to only one group among the one or more groups, such that a variable is associated with a single group and not multiple.

8. The anomaly diagnosis method according to claim 1, wherein
a grouping of variables is set by a user.

9. An anomaly diagnosis apparatus that performs a diagnosis to determine whether an observed value composed of values of multiple variables representing a state of a monitoring target obtained by observing the state of the monitoring target is anomalous, the anomaly diagnosis apparatus comprising:
a memory that stores an anomaly detection model generated by learning by using multiple first observed values, with each of the first observed values including values of multiple variables of a first observed value representing a first state of the monitoring target; and
a processor
that acquires a second observed value, the second observed value including values of multiple variables of the second observed value representing a second state of the monitoring target,
that acquires group information indicating one or more groups in the second observed value, each group constituted by a combination of at least two variables that are related to each other among the multiple variables of the second observed value,
that determines whether the second observed value is anomalous by employing the anomaly detection model that is read from the memory, and
in a case where the second observed value is determined to be anomalous, that identifies a group including the combination of at least two variables causing an anomaly among the one or more groups in the second observed value in accordance with the acquired second observed value and the one or more groups indicated by the acquired group information.

* * * * *